United States Patent Office 3,542,921
Patented Nov. 24, 1970

3,542,921
CLEAR WATER WHITE AQUEOUS ANTISEPTIC
COMPOSITIONS CONTAINING TURPENTINE
William A. Myatt, 3827 Westwood Blvd.,
Culver City, Calif. 90230
No Drawing. Continuation-in-part of application Ser. No.
590,214, Oct. 28, 1966, which is a continuation-in-part
of application Ser. No. 406,161, Oct. 23, 1964. This
application May 10, 1968, Ser. No. 728,309
Int. Cl. A61l 13/00; A61k 27/00
U.S. Cl. 424—144                             2 Claims

ABSTRACT OF THE DISCLOSURE

An aqueous liquid antiseptic composition containing turpentine, magnesium sulfate, aluminum ammonium sulfate, potassium permanganate, potassium iodide, iodine, and formaldehyde solution U.S.P., which antiseptic is a clear water-white solution.

---

This application is a continuation-in-part of my co-pending application Ser. No. 590,214, filed Oct. 28, 1966, and now abandoned which is a continuation-in-part of my earlier application Ser. No. 406,161 filed Oct. 23, 1964, and now abandoned. The benefit of the filing dates of my earlier applications is claimed in the present application.

This invention relates to a liquid antiseptic, and more particularly to an aqueous disinfectant which can be employed for general household applications and may also be used for application to the human skin.

Turpentine, which is more properly known as oil of turpentine or spirits of turpentine, has known antiseptic and germicidal properties. However, turpentine is not soluble in water. Turpentine has, therefore, found little use as an antiseptic since it must either be included in an oily medium or it must be emulsified in an aqueous medium, neither of which is satisfactory for the general use of turpentine as an antiseptic. The germicidal properties of turpentine are reasonably good, although they are capable of improvement by the simultaneous use of turpentine with other germicidals, such that it may be employed for a wider variety of uses.

An object of the present invention is to provide an aqueous disinfectant composition which contains turpentine in a clear and apparently not emulsified condition.

A further object of the invention is to provide a process for making the aforementioned composition.

An additional object of the invention is to provide an aqueous disinfectant composition which contains turpentine in addition to other additives to increase its germicidal effect, and also to provide a process for producing this composition.

Additional objects of the invention will be apparent from a reading of the specification and claims which follow.

In general, my composition comprises a mixture of turpentine, water, magnesium sulfate, aluminum ammonium sulfate, potassium permanganate, potassium iodide, iodine, and formaldehyde, which mixture is agitated until the turpentine goes into solution and the color of the mixture changes from amber to water white. The relative proportions of the ingredients employed in my composition may be varied in the practice of my invention. However, in general, I have found that a satisfactory composition may be prepared using the following proportions of ingredients for each gallon of my finished composition:

| | |
|---|---|
| Turpentine | About 6 cc. to about 16 cc. |
| Magnesium sulfate | About 50 to about 75 grams. |
| Aluminum ammonium sulfate | About 5 to about 7½ grams. |
| Potassium permanganate | Amount equal in quantity to about $\frac{1}{15}$ to $\frac{1}{25}$ of one-half of the total weight of the turpentine and dissolved in a modicum of water. |
| Potassium iodide | About 3 to about 5 grams dissolved in water. |
| Iodine crystals | About 3 to about 5 grams dissolved in water. |
| Formaldehyde solution U.S.P | About 70 cc. to about 90 cc. |
| Water | The balance sufficient to give a total volume of about one gallon. |

In formulating my composition on a small scale, I find it desirable to work with relatively small volumes of the ingredients during the mixing operation and to then dilute the mixed formulation with water to the final volume desired. A convenient volume for use in the mixing of my composition is to begin with one quart of pure water—which preferably is distilled although demineralized water may be used. To the water is added a small quantity, such as 3–8 cc., e.g., 5 cc., of turpentine. The turpentine may be oil of turpentine, U.S.P., and preferably a rectified oil of turpentine U.S.P. However, a good commercial grade of turpentine may also be employed.

In order to obtain thorough mixing of the ingredients, I have found it desirable to add the ingredients in a sequential fashion and to agitate the mixture following each addition. Thus, after the addition of a small quantity of turpentine to the quart of pure water, the mixture may be stirred, as for example by a propeller type mixer, until the turpentine is well dispersed. Following this mixing step, the turpentine would rise to the top if the mixture were allowed to stand.

After dispersion of the turpentine, as described above, from about 50 to 75 grams, e.g., 60 grams, of magnesium sulfate may be added, followed by stirring until the magnesium sulfate is dissolved. The magnesium sulfate may be the ordinary U.S.P. grade which contains 7 molecules of water for each molecule of magnesium sulfate.

After addition of the magnesium sulfate, from about 5 to 7½ grams, e.g., 6 grams, of aluminum ammonium sulfate may be added followed by stirring until the aluminum ammonium sulfate is dissolved. The aluminum ammonium sulfate which may be employed is a commercially pure crystalline grade of ammonium alum, which contains 12 molecules of water for each molecule of aluminum ammonium sulfate.

A small quantity of potassium permanganate, such as about ¼ gram, i.e., about $\frac{1}{15}$ to about $\frac{1}{25}$ of one-half of the total weight of the turpentine present in my composition, may be separately dissolved in a small quantity of water, such as about 50 cc. after which it may be added to the mixture with stirring. Subsequently, about 3–5 grams, e.g., 4 grams, of potassium iodide and about 3–5 grams, e.g., 4 grams, of iodine crystals, each dissolved in water, may be added to the mixture, and stirred until they have completely dissolved. I have found that the addition of the potassium iodide and the iodine crystals in water solution assists their incorporation into my antiseptic mixture.

Next, from about 70 to about 90 cc., e.g., 80 cc., of formaldehyde solution, P.S.P., are added to the mixture and stirred. At this point, the mixture may be diluted with water to a total volume of about one gallon. After the mixture has been so prepared, it may then be allowed to stand for a period of 12 to 36 hours. The mixture at this point is turbid. On the addition of an additional 3 to 8 cc., e.g., 5 cc., of turpentine to the mixture followed by stirring, the mixture becomes clear. This generally takes from about 15 to 30 minutes.

The above order of addition is not critical to my process, although I have found it to be advantageous in producing my antiseptic solution on a small scale. For example, it is not necessary that the turpentine be added in two portions, although I have found that the addition of turpentine in several portions apparently assists the mixing operation to produce a homogeneous composition. If desired, the second addition of turpentine may precede the dilution of the mixture with water to a total volume of about one gallon. Also, the above described procedure of allowing the mixture to stand for a period of about 12 to 36 hours may, if desired, be omitted. However, I have found that when mixing the composition on a small scale, it is more difficult to obtain a homogeneous mixture if the period of standing is omitted. Thus, if the period of standing is omitted, it is necessary to agitate the mixture for a longer period of time in order to obtain homogeneity.

After dilution of the mixture to a total volume of about one gallon and addition of the last portion of turpentine, the mixture is ready for use. However, if desired, it may first be filtered by passing it through common filter paper to remove any impurities which are adventitiously present.

If desired, the final mixture may be given a pleasant fragrance by ading thereto a small amount, such as 1 or 2% by weight, e.g., from about 3 to about 8 grams per gallon of mixture, of oil of peppermint, menthol, thymol, or camphor, or mixtures of these in any relative proportions.

As stated previously, the process steps described above are those which I employ and have found best for mixing my composition on a small scale. These steps are not essential, however, and would not be required when mixing the composition on a larger scale. Thus, in its broadest sense, my invention comprises mixing the above defined ingredients in any sequence, or all at once to obtain a homogeneous water-white antiseptic composition.

The potassium iodide and iodine crystals in my composition are preferably employed in approximately identical quantities.

Surprisingly, my composition contains turpentines in water such that the antiseptic and germicidal properties of turpentine are greatly enhanced. Moreover, the composition is of water-white consistency such that it does not stain fabric or clothing, if accidentally spilled thereon.

My composition, as described above, has been found to have excellent germicidal and bacteriocidal properties and may be used for treatment of material objects, such as hospital floors, and the like. Further, my composition may be employed for veterinarian use or in application to the skin, hooves and the like of animals. Also, it may be used as an antiseptic for human beings, particularly in the treatment of minor cuts, sunburn and the like. It is harmless in use, and is quite non-irritating.

In the foregoing specification, I have made reference to mixing procedures and quantities of ingredients.

I claim:
1. An aqueous liquid antiseptic composition consisting essentially of the following ingredients in the following proportions for about one gallon of said composition:
   from about 6 to about 16 cc. of turpentine;
   from about 50 to about 75 grams of magnesium sulfate;
   from about 5 to about 7½ grams of aluminum ammonium sulfate;
   potassium permanganate in an amount equal to about $\frac{1}{15}$ to $\frac{1}{25}$ of one-half of the total weight of said turpentine;
   from about 3 to about 5 grams of potassium iodide;
   from about 3 to about 5 grams or iodine;
   from about 70 to about 90 cc. of formaldehyde solution, U.S.P.; and
   the balance water,
   said antiseptic composition having a clear water-white consistency.
2. The composition of claim 1 wherein said turpentine is present in an amount of about 10 cc.,
   said magnesium sulfate is present in an amount of about 60 grams;
   said aluminum ammonium sulfate is present in an amount of about 6 grams;
   said potassium iodide is present in an amount of about 4 grams;
   said iodine is present in an amount of about 4 grams; and
   said formaldehyde solution, U.S.P., is present in an amount of about 80 cc.

References Cited

UNITED STATES PATENTS 1,370,263    3/1921    Babb _____ 424—196

OTHER REFERENCES

Dispensatory of the U.S.A. (I) 25th Edition, Part I 1955), pp. 590–591, 693–695, 778–779.

Dispensatory of the U.S.A. (II) 25th Edition, Part I (1955), pp. 1103, 1104, 1106, 1107, 1108, 1465 and 1466.

Merck Index, 7th Edition, Merck and Co., Rahway, N.J. (1960), pp. 41, 460, 461 and 558.

Gregory, Uses and Applications of Chemicals and Related Materials, Reinhold Pub. Co., New York, N.Y. (1939), pp. 145, 290, 291, 324, 367 and 627.

Scheflan, Leopold, et al., Handbook of Solvents, D. Van Nostrand Co., New York (1958), p. 407.

Sneed et al., Comprehensive Inorganic Chem., Vol. III, D. Van Nostrand Co., New York (1959), pp. 90 and 140.

Remington's Practice of Pharmacy, Martin, Eric, et al., Mack Publishing Co., Easton, Pa. (1961), pp. 1146, 1314 and 1315.

Lyman et al., American Pharmacy, J. B. Lippincott Co., Philadelphia (1945), p. 403.

ALBERT T. MEYERS, Primary Examiner

V. D. TURNER, Assistant Examiner

U.S. Cl. X.R.

424—150, 154, 196, 334